April 17, 1951  A. TRASK  2,549,547
HUMIDITY CONTROL SYSTEM
Filed July 6, 1945  4 Sheets-Sheet 1

Inventor:
Allen Trask
By Zabel and Fitzbaugh
Attorneys

April 17, 1951 A. TRASK 2,549,547
HUMIDITY CONTROL SYSTEM
Filed July 6, 1945 4 Sheets-Sheet 2

Inventor:
Allen Trask
By Zabel and Fritzbaugh
Attorneys

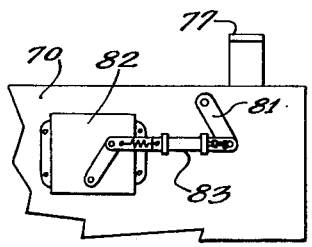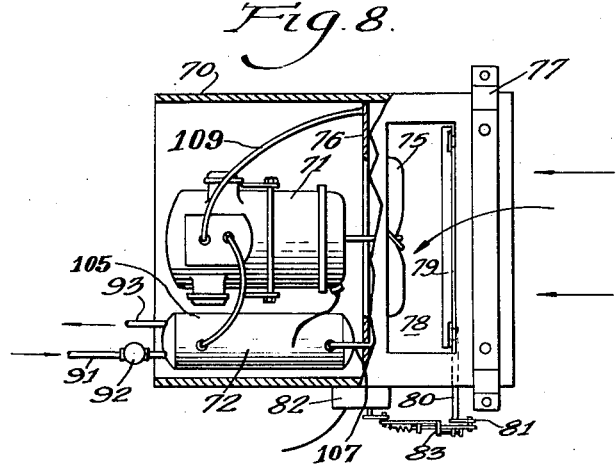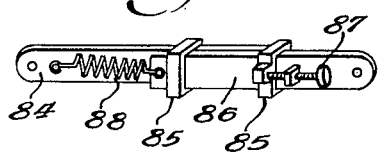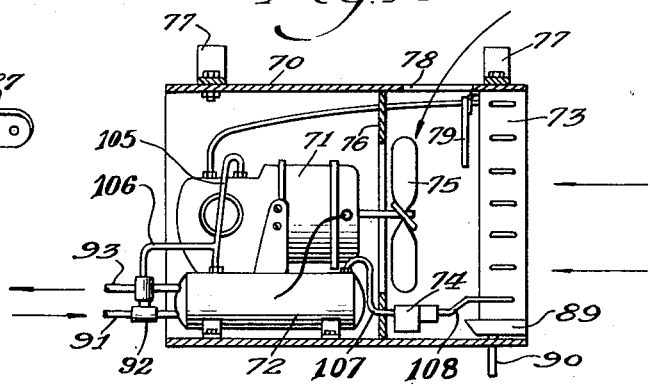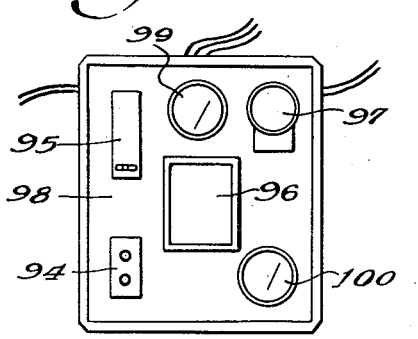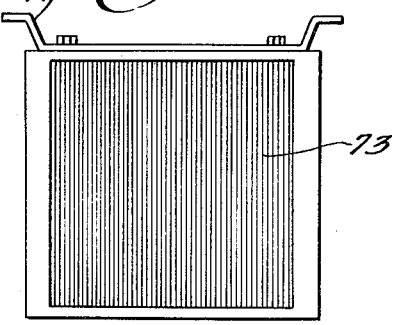

April 17, 1951 A. TRASK 2,549,547
HUMIDITY CONTROL SYSTEM
Filed July 6, 1945 4 Sheets-Sheet 4

Inventor
Allen Trask
By Zabel and Gritzbaugh
Attorneys

Patented Apr. 17, 1951

2,549,547

UNITED STATES PATENT OFFICE 2,549,547

HUMIDITY CONTROL SYSTEM

Allen Trask, Chicago, Ill.

Application July 6, 1945, Serial No. 603,490

5 Claims. (Cl. 62—6)

1

This invention relates to mechanical refrigeration system for effecting and maintaining selected temperatures and selected relative humidities of air within an enclosure.

In food refrigerators, comfort air conditioned enclosures, storage vaults, and in certain industrial processes it is highly desirable to have the most advantageous temperatures and relative humidities effected and maintained automatically.

In the refrigeration systems now in general use for accomplishing the dual purpose of controlling the temperature and humidity of air within an enclosure, the relative humidity is neither subject to selection by means of a variable control, nor is it automatically held substantially constant in spite of the influence of variable factors which normally cause it to fluctuate. In the conventional systems humidity control is selective only at the time of the original design of the system. An evaporator is matched to a condensing unit with the relationship of heat absorbing capacity to condensing capacity selected to produce approximately the required relative humidity under average operating conditions. After this initial selection has been made, no provisions are made for subsequent manual selective change in this relationship.

The resulting humidity in these conventional systems is determined in a general way by the temperature difference between the cooling surface of the evaporator and the air it is cooling in an enclosure. If a large cooling surface is used in relation to the condensing unit capacity, then the temperature difference between the air and the surface will be small, thus providing a high dewpoint resulting in a high relative humidity. Conversely, if the cooling surface is small in relation to the condensing unit capacity, then the temperature difference will be proportionately great to provide a relatively low dewpoint and proportionately low relative humidty.

In enclosures refrigerated by conventional systems having a fixed relation between the condensing unit capacity and the evaporator capacity, it is not possible to maintain a substantially fixed relative humidity under the variable operating conditions existing in the majority of installations. The five principal variables that cause corresponding variations in relative humidity are the following:

1. Variations in ambient temperature;
2. Variations of enclosed air temperature;
3. Variations in temperature difference between enclosed air and the evaporator surface;

2

4. Variations of condensing unit running time; and
5. Variations in the amount of water vapor entering or leaving the enclosure.

A substantially constant relative humidity may be maintained in an enclosure equipped with a refrigeration system, which is subjected to one or more of the above five variable conditions, if the system is constructed to automatically compensate each respective variable by an appropriate functional response. One or more of the five functions following, when appropriately applied to humidity changing variables, will compensate for the respective variables to bring about a substantially constant relative humidity within an enclosure:

1. Addition of water vapor to the enclosed air;
2. Addition of heat to the enclosed air;
3. Variation of evaporator temperature by air speed;
4. Variation of evaporator temperature by change of area exposed to air flow; and
5. Variation of condensing unit running time.

An object of this invention is to provide a unitary refrigeration system adapted to automatically produce the functional responses required for the attainment and maintenance of a substantially constant relative humidity within an enclosure.

Another object is to provide the automatic attainment and maintenance of a substantially constant relative humidity in an enclosure by a refrigeration system adapted to alternately produce two evaporator temperatures in response to the demands of a selectively set humidostat, one temperature being above the dewpoint of the relative humidity for which the humidostat is set, and the other temperature being lower than the dewpoint of said relative humidity for which the humidostat is set.

A further object is to provide automatic control of humidity within a cooled enclosure alternatively removing water vapor and adding water vapor to the air of said enclosure in response to the demands of a manually set humidostat.

Still another object is to provide a unitary refrigeration system wherein motor heat and heat of compression are used to assist in the automatic attainment and maintenance of manually selected relative humidities.

Another important object is to provide for the removal of latent heat from water vapor in an enclosure and for utilizing a portion of this heat for assisting in the further reduction of the relative humidity of the air within the enclosure.

A further object is to provide for the coincidental attainment and maintenance of both a substantially constant relative humidity and a substantially constant temperature in the air within an enclosure.

Still another object is to provide for the automatic control of both humidity and temperature by a refrigeration system whereby a selected relative humidity is attained and maintained as the primary objective, and as a secondary objective a selected temperature is attained and maintained only after the accomplishment of said primary objective.

With reference to the appended drawings in conjunction with the following detailed specifications and explanations, further objectives, purposes, and advantages of this invention will be understood.

In the drawings:

Figure 8 is a top fragmentary sectional view of a third embodiment of this invention showing the internal refrigeration mechanism of a water cooled system adapted for merchandise vaults and comfort air conditioning;

Figure 9 is an enlarged side elevational view of the motor and linkage used to operate the air valve shown in Figure 8;

Figure 10 is a longitudinal sectional view, partially in elevation, of the device shown in Figure 8;

Figure 11 is an enlarged perspective view of the adjustable link connecting the motor lever to the air valve lever shown in Figure 9;

Figure 12 is a front elevational view showing the evaporator end of the system of Figure 8 and Figure 10;

Figure 13 is a diagrammatic view showing an electrical instrument control panel for regulating the functions of the refrigeration system shown in Figures 8 and 10;

Figure 8 is mounted on the ceiling and connected with a control panel mounted on a wall.

For purposes of illustration, specific embodiments of the present invention have been selected. It is recognized, however, that many modifications will occur to the man skilled in the art without departing from the scope and spirit of the invention.

Figure 1:
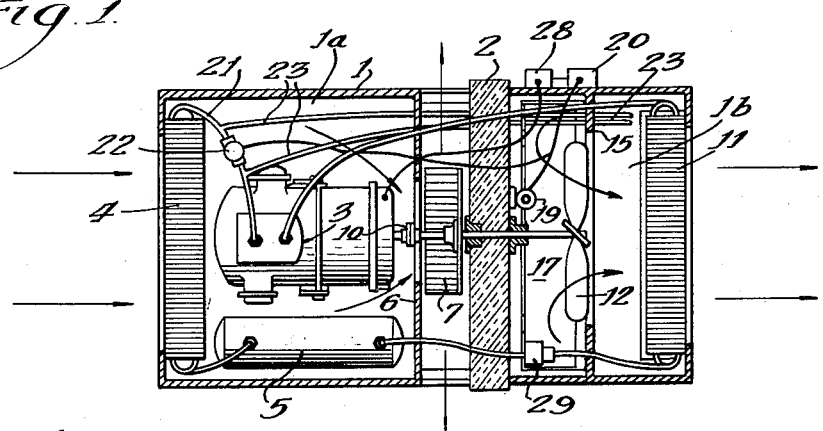
Figure 1 is a horizontal sectional view, partly in elevation, showing the internal refrigeration mechanism of a unitary air cooled system adapted for mounting in a side wall opening of a refrigerator.
Figure 2:
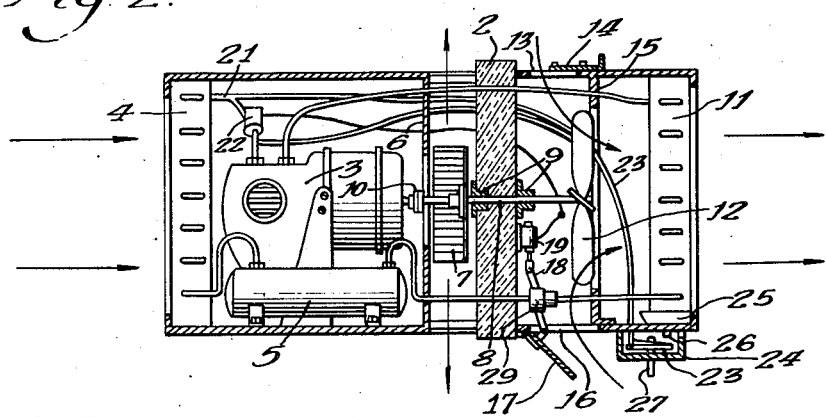
Figure 2 is a vertical sectional view taken through the device shown in Figure 1, portions being shown in elevation.
Figure 3:
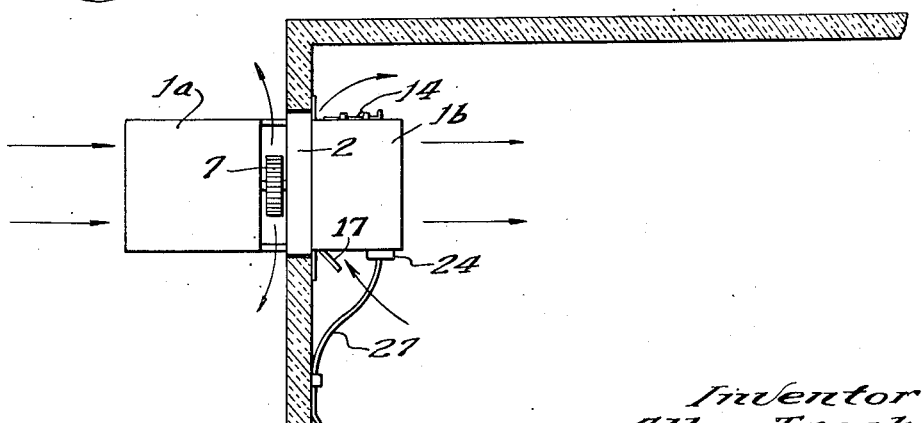
Figure 3 is a more or less diagrammatic view showing the unit of Figure 1 and Figure 2 mounted in a refrigerator wall in its normal operative position, only a fragment of the refrigerator wall being shown.

The first embodiment of this invention is a unitary, air cooled, refrigeration system adapted for controlling the temperature and relative humidity of a food refrigerator. It is shown in the drawings in Figures 1, 2, and 3, wherein cabinet 1 is divided into two compartments 1a and 1b by an insulated partition 2, which is adapted to fit and be secured in a corresponding opening in the side wall of a refrigerator in which the unit is to be assembled and operated. The left-hand compartment 1a encloses an air cooled condensing unit comprising a motor-compressor unit 3, a fin tube condenser 4, and a receiver 5. The right-hand compartment 1b houses an evaporator 11.

A partition 6 in the left-hand portion of the cabinet has a centrally located opening registering with the air inlet opening of a centrifugal squirrel cage type blower 7. The walls of cabinet 1 have openings radially opposite blower 7, to provide an air discharge opening for said blower.

Blower 7 is mounted on shaft 8 which is journaled in bearings 9, mounted in insulated partition 2. Shaft 8 is connected to be driven by the motor of motor-compressor unit 3, by means of flexible coupling 10. In operation of the condensing unit air is drawn by blower 7, through condenser 4 to extract heat, thence over motor-compressor unit 3 to cool it, through partition 6 and finally out of the cabinet radially of blower 7 in the direction of the arrows.

In the right-hand portion of cabinet 1 is a fin tube evaporator 11, operably connected in the usual manner to the condensing unit in the left-hand end of the cabinet 1. Fan 12 is mounted at the right end of shaft 8 and is adapted to blow air through evaporator 11 in the direction indicated by the air flow arrows. An opening 13 in the top portion of cabinet 1 is arranged to be controlled in size by a manually movable slide 14. Said slide is adjjusted to provide the minimum opening required to admit a corresponding minimum quantity of air required for flow through evaporator 11 which will allow evaporator 11 to reach the lowest dewpoint temperature required in the operation of the system. A partition 15 in cabinet 1, acts as a shroud for fan 12 to direct air through evaporator 11. A thermostatic expansion valve 29 (Figure 2) is used in the system.

In the lower part of the right-hand portion 1b of cabinet 1, is an opening 16 (Figure 2) arranged to be opened and closed by hinged air valve 17. Said air valve 17 is connected by means of link 18, to solenoid 19, which opens and closes it in response to the demands of humidostat 20. Cabinet opening 16 admits an additional flow of air to evaporator 11 to increase its operating temperature and thereby raises the dewpoint at which water vapor will be condensed by the evaporator.

The compressor discharge conduit 21 has a solenoid valve 22 admitting refrigerant vapor directly from the compressor to the condenser 4 when it is open. When solenoid valve 22 is closed the compressor discharge vapor is forced to go through an alternate, parallel, side conduit 23 which is in the form of an elongated loop extending with its end in condensate pan 24 under the right-hand end of cabinet 1. Under evaporator 11 is a condensate pan 25 from which a drain opening 26 directs condensed water vapor to the condensate pan 24 to cover the remote portion of discharge conduit 23 therein. A condensate overflow drain conduit 27 provides an outlet for surplus condensate above that required to submerge the remote portion discharge conduit 23 in pan 24.

Humidostat 20 is of the double contact, two circuit type adapted for selective manual setting. A contact to a first circuit is made upon the demand for a reduced humidity. Upon the closing of this circuit solenoid 19 is energized to close air valve 17. The air flow through evaporator 11 is thereupon reduced to result in a lower evaporator temperature below the dewpoint of the air being drawn through the evaporator 11. Thus water vapor is eliminated from the air of a refrigerator in which the system is operating, and the relative humidity of the air is reduced. When the relative humidity of the air reaches the amount called for by the humidostat, said first contact is opened and air valve 17 falls open by gravity.

When the relative humidity of the air surrounding humidostat 20 is lower than that required by the humidostat setting, a second contact closes a second circuit which energizes solenoid valve 22. Thereupon hot compressor discharge refrigerant vapor is caused to flow through conduit 23 into condensate pan 24 where it is submerged in water. The hot refrigerant vapor includes sensible and latent heat taken from the refrigerator in which the system is functioning, together with heat of compression from the compressor, and electric motor heat taken from the electric motor parts disposed in heat exchange relationship with a portion of the compressor enclosing relatively cool refrigerant vapor as it is drawn from the evaporator ready to be compressed. Heat from all of these sources is transferred to the water in pan 24 and raises the temperature and vapor pressure of the water. This heat causes the water in pan 24 to evaporate so as to increase the relative humidity in the refrigerator. When the relative humidity becomes increased to meet the requirements of humidostat 20, the second contact opens and solenoid valve 22 opens in response thereto to stop the flow of hot discharge vapor to the water evaporating pan 24 through conduit 23.

In this embodiment of the invention the motor-compressor unit operation is controlled by the temperature demands of thermostat 28. Required humidity correction takes place only during compression cycles demanded by the thermostat. An air-cooled refrigeration system constructed in accordance with this embodiment of the invention has a wide humidity correction capacity to counteract the principal variables which operate to alter the required humidity during the off cycles of the refrigeration system.

A second embodiment of this invention is a unitary, water cooled, refrigeration system adapted for controlling the temperature and relative humidity of a food refrigerator. It is shown in Figures 4, 5, 6, and 7; wherein a single cabinet is composed of two compartments; namely, a closed, insulated compartment 35, and an open ended, uninsulated compartment 36. Compartment 35 encloses a water cooled condensing unit comprising a motor-compressor unit 37, and water cooled condenser-receiver unit 38, and a water cooled fin coil 39 for extracting excess heat from the air in said compartment.

Figure 4:
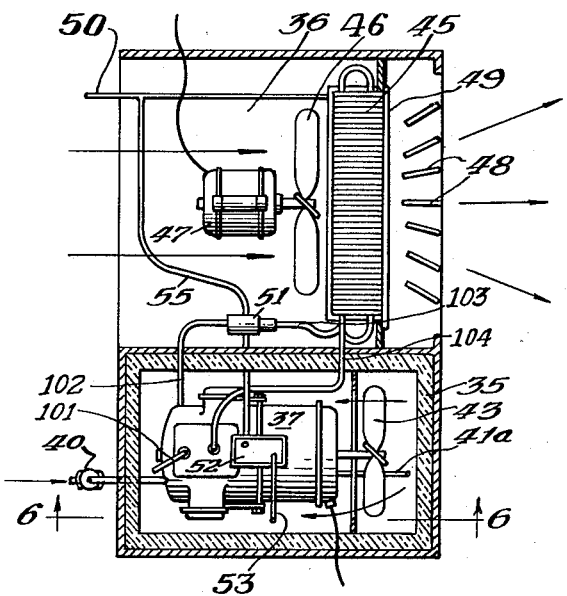
Figure 4 is a horizontal sectional view of a second embodiment of this invention showing the internal refrigeration mechanism of a unitary water cooled system adapted to be mounted on the ceiling of a refrigerator.
Figure 5:
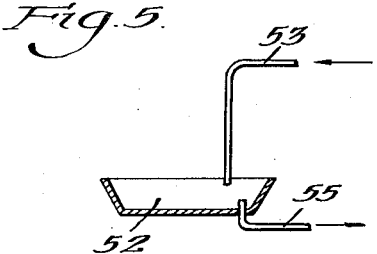
Figure 5 is an enlarged vertical sectional view of the water evaporating pan that in Figure 4 is shown assembled on top of the motor-compressor unit, the view showing fragments of the water inlet and drain pipes.
Figure 6:
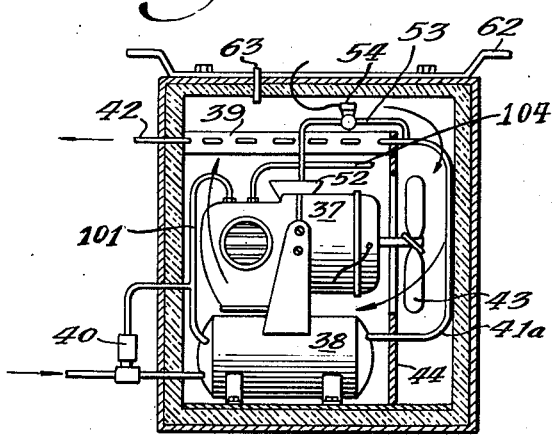
Figure 6 is a transverse sectional view taken on the line 6—6 of Figure 4.

Referring to Figs. 4 to 6, compressor discharge tube 101 leads compressed refrigerant from the compressor 37 to the water cooled condenser 38. Tube 102 carries the condensed liquid refrigerant from the condenser 38 to expansion valve 51. Tube 103 connects expansion valve 51 to the inlet of the evaporator 45. Tube 104 from evaporator 45 carries refrigerant vapor to the suction inlet of the compressor 37.

During operation of the condensing unit water control valve 40 admits cooling water to the condenser-receiver 38, from which it flows through pipe 41a to fin coil 39 and from which it is led out to a drain through pipe 42. A fan 43 mounted on the motor shaft causes a circulation of the air within compartment 35. A partition 44 with an opening suitably registering with fan 43, is arrarnged to direct the flow of said internal air over motor-compressor unit to extract its surplus heat, then to direct said air over fin coil 39 which absorbs said surplus motor-compressor heat, and thence around to the suction side of fan 43 to complete a circuit.

In compartment 36 is an evaporator fin coil 45. A fan 46, driven by a variable speed fan motor 47 of the capacitor run type, blows air through evaporator 45 from which it is dispersed by deflector blades 48. Below fin coil 45 is a condensate pan shown at 49 in Figure 4 for collecting condensed water vapor. A drain pipe 50 leads condensate to an outside drain system. A thermostatic expansion valve 51 meters refrigerant to the evaporator 45.

On the top of motor-compressor unit 37 is a pan 52 in heat exchange relation with said unit. A pipe 53 branches from pipe 41a to lead to pan 52 through a solenoid valve 54, which controls the flow of heated cooling water to pan 52. An overflow pipe 55 leads from pan 52 to drain pipe 50 (Figs. 4, 5 and 6).

Figure 7:
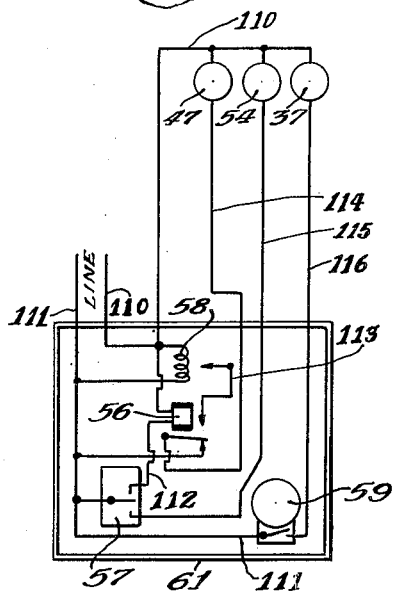
Figure 7 is a wiring diagram of the temperature and humidity control circuits used in the refrigeration system shown in Figure 4 and Figure 6.

The wiring diagram Figure 7, indicates the instruments and electrical elements of the refrigeration system which cause it to effect and maintain selected temperatures and relative humidity. A single pole relay 56, a humidostat 57, a variable transformer 58, and a thermostat 59 are mounted on a control panel 61, and connected by suitable wiring as indicated to the fan motor 47, the solenoid valve 54, and the compressor motor 37. A pair of mounting brackets 62 (Figure 6) is provided for mounting the entire unit on the ceiling.

Wire 110 (Fig. 7) is the neutral side of the current supply line to variable transformer 58, fan motor 47, solenoid 54, compressor motor 37 and relay coil 56. Wire 111 carries the opposite side of the current supply line to the variable transformer 58, relay 56, humidostat 57 and thermostat 59.

A rise in humidity above the setting of humidostat 57, causes humidostat 57 to make the upward contact shown to energize relay coil 56 through wire 112. Relay 56 then closes to establish a circuit through variable transformer 58 to fan motor 47 to run it at a reduced speed in accordance with the setting of the transformer.

When the humidostat is satisfied relay 56 is deenergized to make an open position contact connecting line wire 111 with wire 114 to operate fan motor 47 at its full speed.

A reduction of humidity below the setting of humidostat 57, causes humidostat 57 to make a downward contact shown, to complete a circuit to energize solenoid valve 54 through wire 115. Thermostat 59 controls the operation of compressor motor 37 by controlling the circuit from line wire 111 to the compressor motor through wire 116.

In operation the thermostat controls the operating time of the system by causing the condensing unit to function during the time the thermostat demands temperature reduction. The humidostat is of the double contact type having a first contact which completes a circuit upon the demand for a reduction of relative humidity, and a second contact which completes a circuit upon the demand for an increase of relative humidity. When the humidostat is satisfied by the existence of the selected relative humidity, no contact is made.

During the time that the required relative humidity exists and no change is called for by the humidostat, the fan motor 47 runs at its full normal speed. When a reduction of relative humidity is demanded said first contact is made to establish a circuit to fan 47, through variable transformer 58, to reduce the speed of fan 46 to a predetermined minimum which reduces the volume of air flowing through the evaporator 45 and thereby produces in the evaporator 45 the temperature of the minimum dewpoint required in the functioning of the refrigeration system. Water vapor is then condensed and eliminated from the air of a refrigerator in which the system is functioning. When the required relative humidity is reached, said first humidostat contact is broken, fan motor 47 then attains its normal speed, the temperature of the evaporator 49 is raised above the dewpoint of the air being cooled, and condensation is stopped.

When an increase of relative humidity is required, a second contact is made in humidostat 57, completing a circuit to solenoid valve 54 to open it and supply water to pan 52. Here heated water from the cooling system is evaporated by the heat of the motor-compressor unit which includes sensible and latent heat taken from the refrigerator in which the system is functioning, also heat of compression from the compressor, and electric motor heat taken from the electric motor parts in heat exchange relationship with the compressor body and pan 52. The water vapor so produced within insulated compartment 35 escapes therefrom through opening 63 to increase the relative humidity of the refrigerator in which the system is operating. The occurrence of the required increase of relative humidity caused said second humidostat contact to be broken and thereupon solenoid valve 54 closes to prevent additional water from being evaporated in pan 52.

Referring to Figure 5, it will be seen that the height of the projection of drain pipe 55 into evaporating pan 52 will determine the amount of water remaining to be evaporated at the time the satisfied humidostat closes the solenoid valve 54. By this means water vapor is discharged beyond that required to open the humidity increase contact of the humidostat 57, but not in an amount sufficient to close the humidity reduction contact of the humidostat.

A water cooled refrigeration system constructed in accordance with this embodiment of the invention, has a wide humidity correction capacity to counteract the principal variables which operate to alter the required humidity during the off cycles of the refrigeration system.

A third embodiment of this invention is a unitary, water cooled, refrigeration system adapted for controlling the temperature and relative humidity of enclosures requiring moderate temperature reduction, and relative humidity in the range of 50% to 70%, for comfort air conditioning or the conditioning of the air in such enclosures as vaults for the storage of furs, woolen garments, or other merchandise.

This embodiment is shown in Figures 8 to 12, inclusive, wherein a single cabinet 70 encloses a water cooled condensing unit comprising a motor-compressor unit 71, and a condenser-receiver unit 72. At the right-hand end of cabinet 70, is a fin tube evaporator coil 73, to which refrigerant is metered by thermostatic expansion valve 74. A fan 75 is mounted on the end of the compressor motor shaft to draw air through evaporator 73, and discharge it over motor-compressor unit 71 for cooling it. A partition 76 in cabinet 70 has a circular opening arranged in relation to fan 75 as a shroud to direct the flow of fan moved air as above described. A pair of mounting brackets 77 is provided for mounting the entire unit on the ceiling of a room.

In the top of cabinet 70 is an opening 78 (Figure 10) arranged to be closed by a hinged air valve 79. An arm 80 (Figure 8) and lever 81 are connected to air valve 79 for opening and closing the valve. A two position electric damper motor 82 is operatively connected to air valve lever 81 by means of adjustable link 83, for opening and closing air valve 79.

Adjustable link 83 shown in Figure 11, comprises a first bar 84 provided with two fixed collars 85. A second bar 86 is arranged to slide in collars 85, longitudinally of bar 84, to a minimum combined length adjustably fixed by stop screw 87. The latter being fixed with respect to bar 86. A coil spring 88 tends to hold bar 84 and bar 86 at the minimum combined length determined by the position of screw 87.

Evaporator 73 is provided with a condensate drain pan 89 having a drain pipe 90. A cooling water inlet pipe 91 feeds the water cooled condenser 72 through a water control valve 92. Cooling water is discharged from the condenser to the drain through pipe 93.

Compressor discharge tube 105 (see Figs. 8 and 10) leads compressed refrigerant vapor to water cooled condenser 72. Tube 106 conducts discharge vapor pressure to water control valve 92. Tube 107 leads condensed liquid refrigerant from the condenser 72 to expansion valve 74. Tube 108 leads refrigerant at a reduced pressure from expansion valve 74 to the inlet of the evaporator 73. Tube 109 leads refrigerant vapor from evaporator 73 to the suction inlet of compressor 71 to complete the refrigerant circuit.

Figure 14:
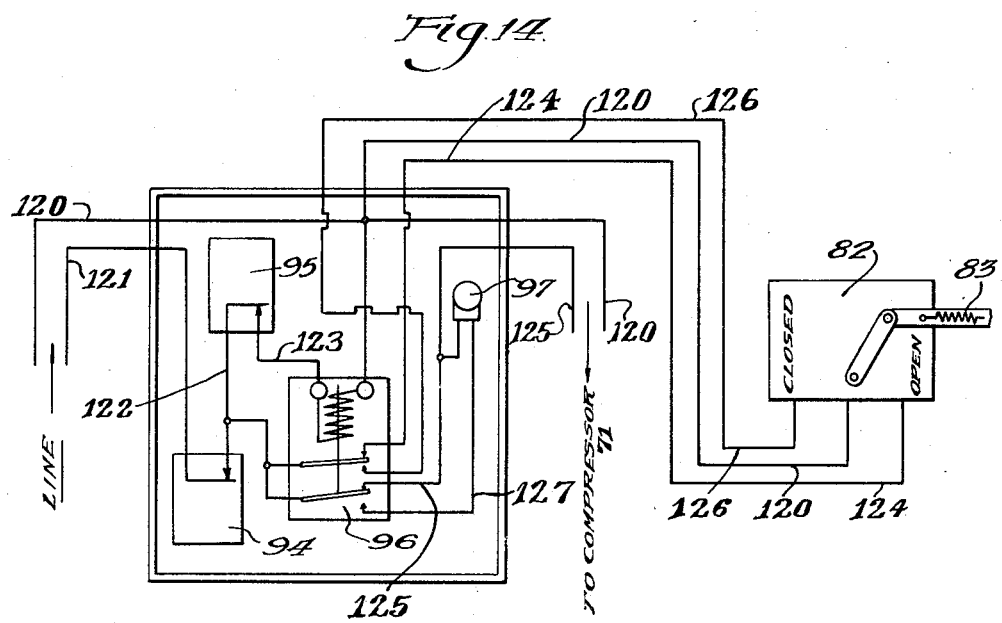
Figure 14 is an electrical wiring diagram of the control panel of Figure 12.

In operation this refrigeration system is controlled by an electric circuit illustrated by the instrument panel shown in Figures 13 and 14, wherein a push button switch 94, a single circuit humidostat 95, a relay 96, and a thermostat 97 are mounted on a panel board 98. A hygrometer 99 and a thermometer 100 are provided as direct indicating instruments. In Figure 14 a wiring diagram of these instruments is shown and is adapted to cause the system to attain a selected relative humidity as its primary objective, and a selected temperature as its secondary objective.

Wire 120 (Fig. 14) is the neutral side of the current supply line to relay 96, damper motor 82 and compressor 71. Wire 121 carries the opposite side of the current supply line to manual switch 94, and thence through wire 122 to humidostat 95.

A rise in humidity above the setting of humidostat 95, closes the humidostat contact to establish a circuit from the line 121, switch 94 and wire 122, through wire 123, to the coil of relay 96, to energize the relay and make two upward contacts shown, to wire 124 and wire 125. Wire 124 establishes a circuit to damper motor 82, causing it to move to its open position. Wire 125 establishes a circuit to compressor 71.

When humidostat 95 is satisfied its contact opens to break the circuit through wire 123 to relay 96. Then relay 96 closes its lower set of contacts to establish circuits through wire 126 and wire 127. Wire 126 establishes a circuit to damper motor 82, causing it to move to its closed position. Wire 127 establishes a circuit to thermostat 97 which in turn then controls compressor 71 through wire 125.

Figure 15:
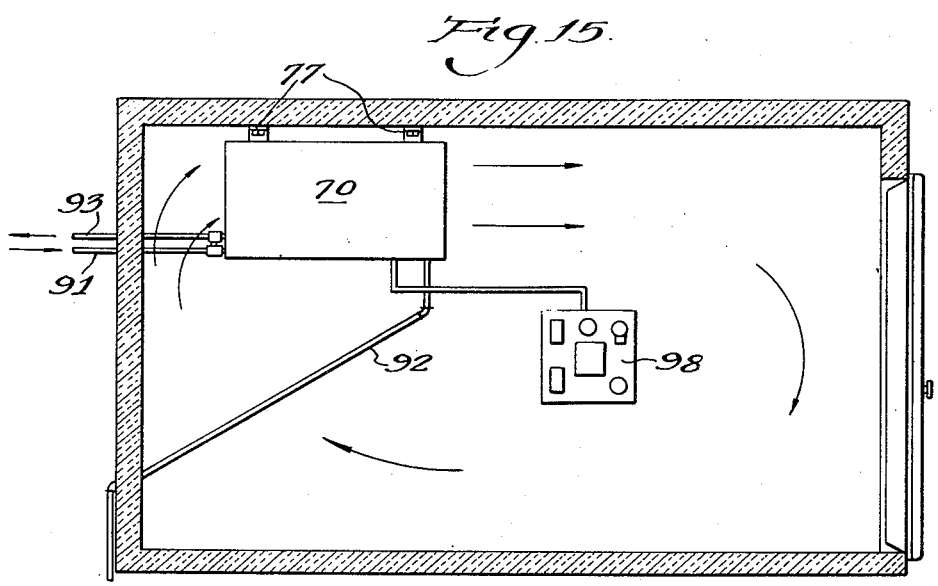
Figure 15 is a diagram of an enclosure wherein a unitary refrigeration system of the types shown in Figure 4

When the relative humidity of an enclosure, such as is diagrammatically represented in Figure 15, is in excess of the required amount for which the humidostat 95 is set, then damper motor 82 actuates link 83 to cause air valve 79 to open to the position as shown in Figures 8 and 10. Fan 75 then draws a portion of its air through evaporator 73 and a portion through opening 78. The air flow reduction through the evaporator reduces its heat load, and the condensing unit causes the evaporator temperature to drop below the dewpoint of the ambient air. By means of adjustable air valve link 83, the size of the air inlet opening may be initially controlled. The air valve opening is adjusted to give the maximum permissible evaporator temperatures over the frosting point.

When the desired humidity is reached humidostat 95 causes damper motor 82 to close air valve 79, and include thermostat 97 in the compressor motor circuit. The full air capacity of fan 75 is then drawn through evaporator 73 to raise its temperature above the dewpoint of the ambient air. Sensible heat only is then extracted from the air until thermostat 97 is satisfied.

In this embodiment of the invention, heat of the motor-compressor unit 71 is used to assist in the reduction of relative humidity by causing it to reheat air drawn through the evaporator. In the proportion that the motor-compressor unit is cooled by the air fan 75 blows over it, that air is heated and its relative humidity thereby reduced. The heat so used for assisting humidity reduction includes electric motor heat, heat of compression, and both latent heat and sensible heat of the air conditioned by the refrigeration system.

This specification makes it apparent that each of the three embodiments of this invention comprises a novel structure and control means for removing varying proportions of water vapor from the air of an enclosure while maintaining its temperature between close predetermined fixed limits.

It will also be understood that each of the three embodiments of this invention include means using the heat developed in the functioning of a condensing unit for changing and for maintaining a predetermined relative humidity in an enclosure.

In addition to the specific embodiments of the invention herein shown and described, it will be understood that numerous details of the construction may be altered or omitted without departing from the spirit and scope of the invention as disclosed and claimed, and that I do not desire to limit the invention to the exact construction herein set forth.

I claim as my invention:

1. An enclosure for a refrigerated space, an opening in said enclosure, a cabinet adapted to be inserted partially through said enclosure opening, a refrigeration system in said cabinet, a partition in said cabinet adapted to plug said enclosure opening; a compressor, a motor, a condenser, and a condenser fan in said refrigeration system assembled within the portion of said cabinet not inserted within said enclosure; an evaporator, and an evaporator fan assembled within the portion of said cabinet adapted for insertion into said enclosure; a humidostat, means responsive to said humidostat for changing the C. F. M. flow of air through said evaporator from a maximum to a minimum flow, and means for changing the C. F. M. of said minimum flow.

2. An enclosure for a refrigerated space, an opening in said enclosure, a cabinet adapted to be inserted partially through said enclosure opening, a refrigeration system in said cabinet, a partition in said cabinet adapted to plug said enclosure opening; a compressor, a motor, a condenser, and a condenser fan in said refrigeration system assembled within the portion of said cabinet not inserted within said enclosure; an evaporator, and an evaporator fan assembled within the portion of said cabinet adapted for insertion into said enclosure; a humidostat, and variable means responsive to said humidostat for changing the C. F. M. flow of air admitted to the suction of said evaporator fan.

3. An enclosure for a refrigerated space, an opening in said enclosure, a cabinet adapted to be inserted partially through said enclosure opening, a refrigeration system in said cabinet, a partition in said cabinet adapted to plug said enclosure opening; a compressor, a motor, a condenser, and a condenser fan in said refrigeration system assembled within the portion of said cabinet not inserted within said enclosure; an evaporator, and an evaporator fan assembled within the portion of said cabinet adapted for insertion into said enclosure; a humidostat, an air valve in said cabinet located to admit air to said evaporator fan in response to said humidostat, and a manually adjustable opening in said casing for admitting additional air to said fan.

4. An enclosure for a refrigerated space, an opening in said enclosure, a cabinet adapted to be inserted partially through said enclosure opening, a refrigeration system in said cabinet, a partition in said cabinet adapted to plug said enclosure opening; a compressor, a motor, a condenser, and a condenser fan in said refrigeration system assembled within the portion of said cabinet not inserted within said enclosure; an evaporator, and an evaporator fan assembled within the portion of said cabinet adapted for insertion into said enclosure; a humidostat, a manually adjustable opening for admitting a minimum C. F. M. air flow to said evaporator fan, and an adjustable air valve for admitting an additional air flow to said evaporator fan in response to said humidostat.

5. In a unitary refrigeration system of the compression type, an evaporator, a fan for circulating air through the evaporator, a humidostat, means responsive to said humidostat for changing the C. F. M. flow of air through said evaporator from a maximum to a minimum flow, and means for changing the C. F. M. of said minimum flow.

ALLEN TRASK.

REFERENCES CITED

The following references are of record in the file of this patent:

UNITED STATES PATENTS

| Number | Name | Date |
|---|---|---|
| 1,950,344 | Williams | Mar. 6, 1934 |
| 2,019,091 | Philipp | Oct. 29, 1935 |
| 2,133,039 | Philipp | Oct. 11, 1938 |
| 2,188,526 | Burden | Jan. 30, 1940 |
| 2,200,215 | Lewis | May 7, 1940 |
| 2,200,302 | Ruff | May 14, 1940 |
| 2,268,769 | Newton | Jan. 6, 1942 |
| 2,290,426 | Haines | July 21, 1942 |
| 2,336,735 | Jones | Dec. 14, 1943 |
| 2,471,692 | Jones | May 31, 1949 |